(12) United States Patent
Muzzey et al.

(10) Patent No.: US 10,985,604 B2
(45) Date of Patent: Apr. 20, 2021

(54) POWER SUPPLY REDUNDANCY DEVICE FOR A DISPLAY SYSTEM

(71) Applicant: Daktronics, Inc., Brookings, SD (US)

(72) Inventors: Daniel Paul Muzzey, Aurora, SD (US); Aaron Bucholz, Brookings, SD (US); Jason Brands, Brookings, SD (US); Karl Seidl, Brookings, SD (US)

(73) Assignee: Daktronics, Inc., Brookings, SD (US)

( * ) Notice: Subject to any disclaimer, the term of this patent is extended or adjusted under 35 U.S.C. 154(b) by 0 days.

(21) Appl. No.: 16/500,359

(22) PCT Filed: Apr. 2, 2018

(86) PCT No.: PCT/US2018/025703
§ 371 (c)(1),
(2) Date: Oct. 2, 2019

(87) PCT Pub. No.: WO2018/187218
PCT Pub. Date: Oct. 11, 2018

(65) Prior Publication Data
US 2020/0127490 A1    Apr. 23, 2020

Related U.S. Application Data

(60) Provisional application No. 62/480,845, filed on Apr. 3, 2017.

(51) Int. Cl.
*H02J 9/06* (2006.01)
*G06F 3/14* (2006.01)
*G09G 3/32* (2016.01)

(52) U.S. Cl.
CPC ............ *H02J 9/061* (2013.01); *G06F 3/1446* (2013.01); *G09G 3/32* (2013.01); *G09G 2300/026* (2013.01)

(58) Field of Classification Search
CPC ....................................................... H02J 9/061
(Continued)

(56) References Cited

U.S. PATENT DOCUMENTS

| 7,502,950 B1 | 3/2009 | Brands |
| 2004/0255286 A1* | 12/2004 | Rothman .................. G06F 8/65 |
| | | 717/168 |

(Continued)

FOREIGN PATENT DOCUMENTS

WO    WO-2018187218 A1    10/2018

OTHER PUBLICATIONS

"International Application Serial No. PCT/US2018/025703, International Search Report dated Jun. 15, 2018", 4 pgs.
(Continued)

*Primary Examiner* — Joseph Chang
(74) *Attorney, Agent, or Firm* — Schwegman Lundberg & Woessner, P. A.

(57) ABSTRACT

A system comprises a redundancy circuit board including a plurality of primary input connectors each connectible to a primary power supply that supplies primary electrical energy, a redundancy power input connector connectible to a redundant power supply that supplies redundant electrical energy, a plurality of output connectors connectible to a display component powerable by the primary or redundant electrical energy, and a plurality of electrical pathways including primary pathways each connecting a primary input connector to a corresponding output connector, redundant pathways each connecting the redundancy input connector to a corresponding output connector. The system also includes one or more electrical devices that detect whether primary electrical energy has been interrupted along a first primary pathway, activate the redundant power supply to supply redundant electrical energy to the redundancy input (Continued)

connector, and direct redundant electrical energy along a first redundant pathway to the first output connector.

20 Claims, 3 Drawing Sheets

(58) Field of Classification Search
USPC .......................................................... 307/66
See application file for complete search history.

(56) References Cited

U.S. PATENT DOCUMENTS

2005/0049825 A1* 3/2005 King .................. H04L 43/0817
702/177
2012/0319485 A1 12/2012 Ewing et al.

OTHER PUBLICATIONS

"International Application Serial No. PCT/US2018/025703, Written Opinion dated Jun. 15, 2018", 9 pgs.
"Australian Application Serial No. 2018248766, First Examination Report dated Jul. 3, 2020", 3 pgs.
"European Application Serial No. 18720467.2, Response filed Apr. 30, 2020 to Communication pursuant to Rules 161(2) and 162 EPC dated Oct. 7, 2019", 27 pgs.
"International Application Serial No. PCT/US2018/025703, International Preliminary Report on Patentability dated Oct. 17, 2019", 11 pgs.
"Australian Application Serial No. 2018248766, Response filed Nov. 3, 2020 to First Examination Report dated Jul. 3, 2020", 21 pgs.

* cited by examiner

POWER SUPPLY REDUNDANCY DEVICE FOR A DISPLAY SYSTEM

CLAIM OF PRIORITY

This application is a U.S. National Stage Filing under 35 U.S.C. § 371 from International Application No. PCT/US2018/025703, filed on Apr. 2, 2018, and published as WO 2018/187218 on Oct. 11, 2018, which application claims the benefit of priority of U.S. Provisional Application Ser. No. 62/480,845, filed Apr. 3, 2017, which applications are incorporated by reference herein in their entireties.

BACKGROUND

Displays comprising a plurality of light-emitting elements (such as light-emitting diodes, or LEDs) are used for the display of information. For example, dynamic message displays can comprise an array of light-emitting elements configured to display information. In some examples, individual displays are formed from a plurality of smaller display modules that are operated together to form a larger display.

SUMMARY

The present disclosure describes a power-supply redundancy system (also referred to as "power redundancy system" or simply "redundancy system") that can be used to provide power supply redundancy that does not rely on proprietary built-in redundancy architecture as provided by power supply manufacturers. Rather, the redundancy system includes one or more primary power input connectors (also referred to as "primary input connector") that each can connect to and receive the power output from a corresponding primary power supply regardless of the proprietary configuration of the corresponding primary power supply. The redundancy system includes wiring that directs the power received at each primary input connector to a corresponding power output connector (also referred to simply as "output connectors"), which can be connected to one or more components of a display system, such as one or more display modules in a system for displaying transportation information. The redundancy system also includes at least one redundancy input connector that can connect to and receive the power output from a redundant power supply regardless of the proprietary configuration of the redundant power supply.

The redundancy system includes wiring that determines if a power supply pathway has failed between any of the one or more primary power supplies and the one or more corresponding components that are to be powered by the primary power supply. In some examples, the circuitry of the redundancy system can detect one of, and in some examples both of: failure of any of the one or more primary power supplies, or an interruption in the flow of electrical energy between a primary power supply connected to one of the primary input connectors and one or more of the components connected to the output connector that corresponds to that particular primary input connector. In some examples, the redundancy system also includes diagnostic logic that can analyze and diagnose problems with other components associated with the display system.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
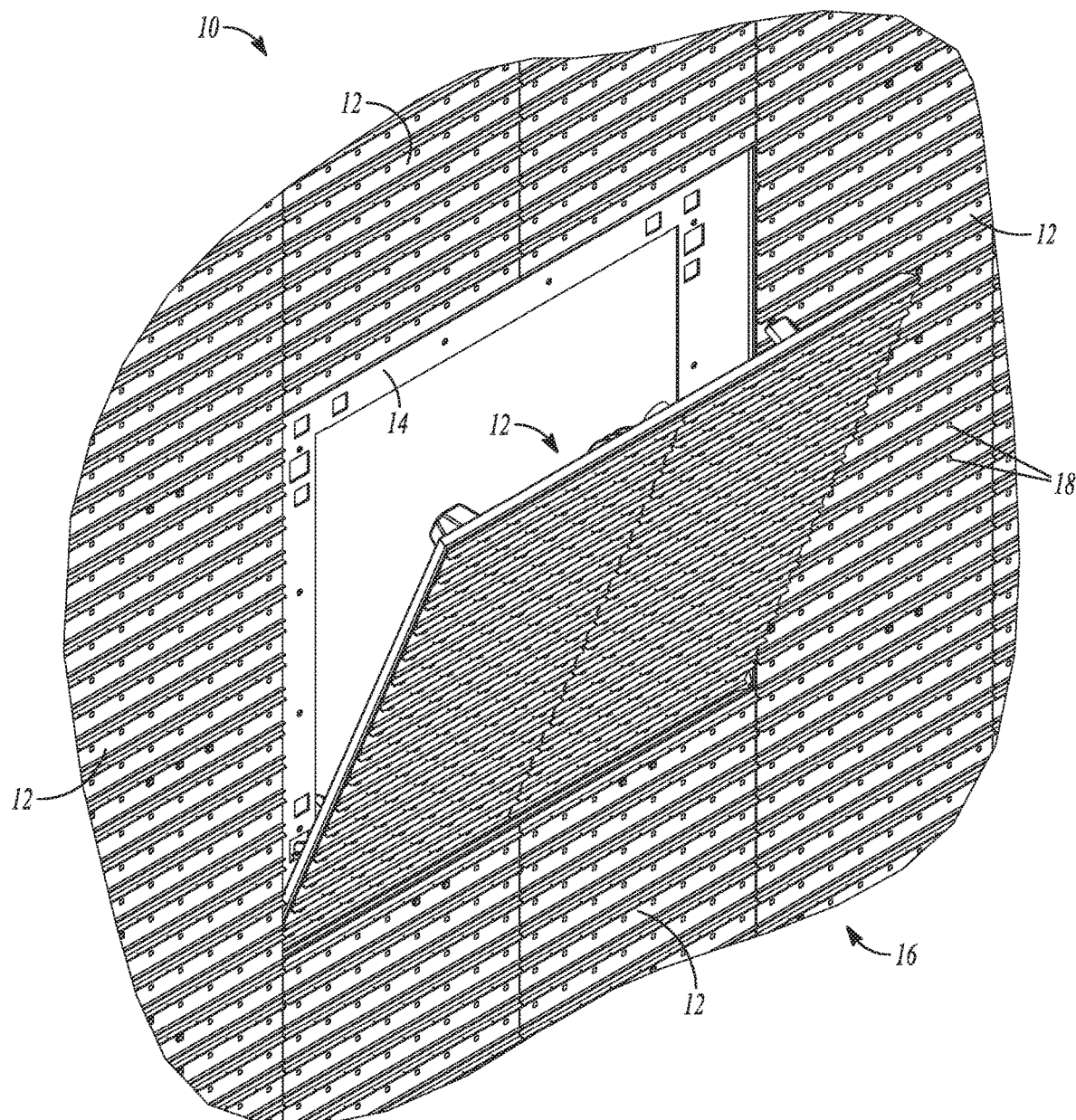
FIG. 1 is a partial perspective view of an example light-emitting display comprising a plurality of individual display modules that are operated in a cooperative manner to display information on the light-emitting display.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The example embodiments may be combined, other embodiments may be utilized, or structural, and logical changes may be made without departing from the scope of the present invention. While the disclosed subject matter will be described in conjunction with the enumerated claims, it will be understood that the exemplified subject matter is not intended to limit the claims to the disclosed subject matter. The following detailed description is, therefore, not to be taken in a limiting sense, and the scope of the present invention is defined by the appended claims and their equivalents.

References in the specification to 'one embodiment', "an embodiment," "an example embodiment," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually Incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the steps can be carried out in any order without departing from the principles of the invention, except when a temporal or operational sequence is explicitly recited. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A. Step B, Step C, Step D, and Step E" shall be construed to mean step A is carried out first, step E is carried out last, and steps B, C, and D can be carried out in any sequence between steps A and E, and that the sequence still falls within the literal scope of the claimed process. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

FIG. 1 shows an example of an information display 10 (also referred to simply as "display 10") that is configured to display one or more of video, graphical, or textual information. The display 10 includes a plurality of individual display modules 12 mounted to a support structure 14. The plurality of display modules 12 are operable together so that the overall display 10 appears as a single, larger display. FIG. 1 shows one of the display modules 12 being in a tilted position relative to the support structure 14, which can occur when that display module 12 is in the process of being mounted to, or dismounted from, the support structure 14. The other display modules 12 in the display 10 are mounted to the support structure 14.

The display 10 can include a display surface 16 configured to display the video, graphical, or textual information from the display 10. A plurality of light-emitting elements 18 are mounted to the display surface 16. The light-emitting elements 18 are operated together to display the video, graphical, or textual information on the display 10. The light-emitting elements 18 can be any type of light-emitting technology known or yet to be discovered for the emission of light from a small area, particularly for light-emitting technology that is or can be used display of visual information, such as video, graphical, or textual information. At the time of filing of the present application, light-emitting diodes (LEDs) are one of the most common light-emitting technologies in use for video or graphical displays of the type described herein. As such, for the sake of brevity, the light-emitting elements 18 will be referred to as LEDs 18 throughout the present disclosure. However, it will be understood that any time the following description uses the term "light-emitting diode" or "LED," that light-emitting devices other than LEDs can be used, including, but not limited to, liquid crystal display devices (LCDs), organic light-emitting diodes (OLEDs), organic light-emitting transistors (OLETs), surface-conduction electron-emitter display devices (SEDs), field-emission display devices (FEDs), laser TV quantum dot liquid crystal display devices (QD-LCDs), quantum dot light-emitting diode display devices (QD-LEDs), ferro-liquid display devices (FLDs), and thick-film dielectric electroluminescent devices (TDELs).

Figure 2:
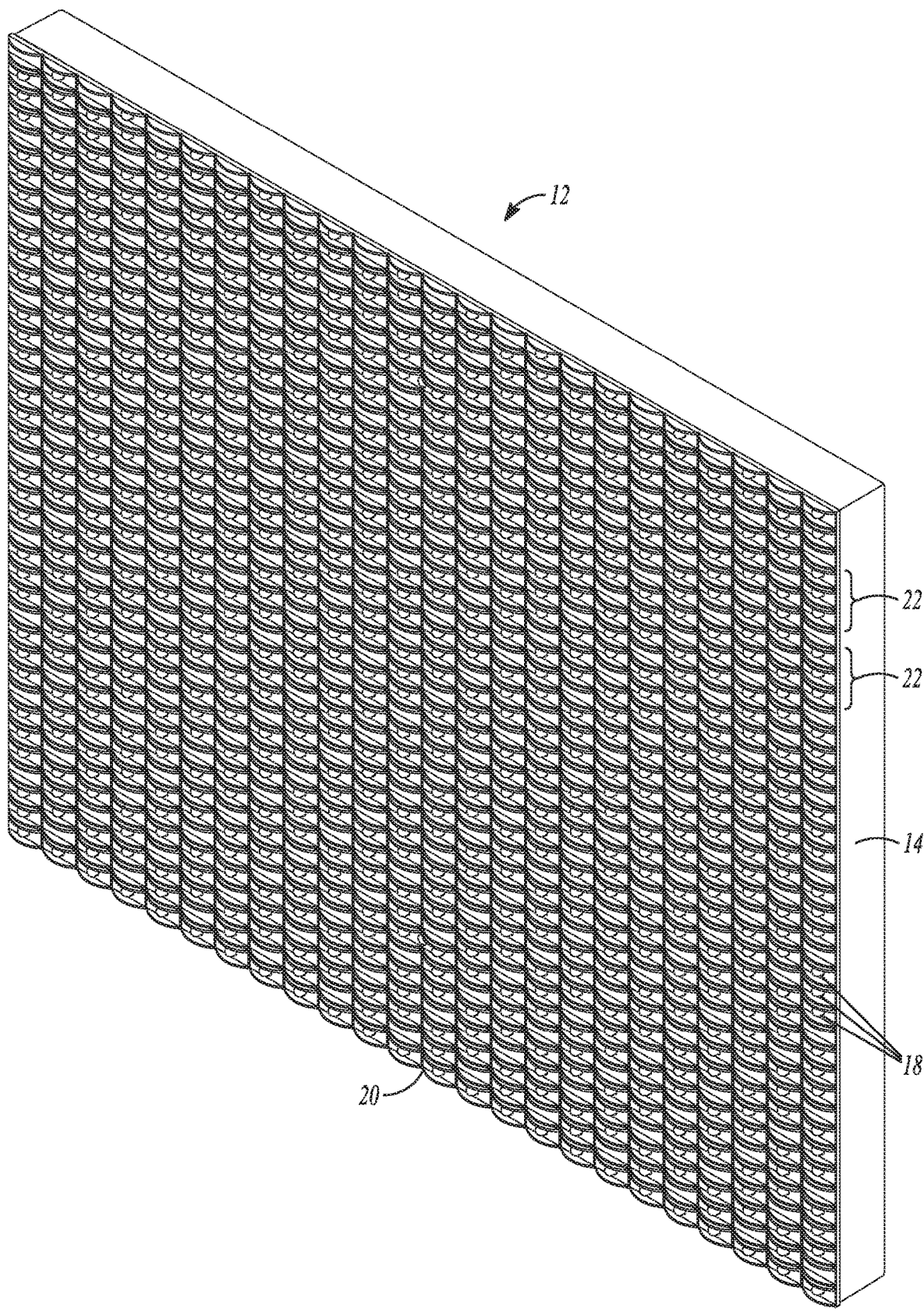
FIG. 2 is a perspective view of an example light-emitting display module, which can be used as one of the individual display modules in the light-emitting display of FIG. 1.

FIG. 2 is a perspective view of an example display module 12 that can be used in the display 10 of FIG. 1. The display module 12 includes a face 20 configured to provide for a display of graphics or video content. A plurality of the LEDs 18 are positioned on the face 20 and the LEDs 18 can be operated in such a way that the display module 12 will display a portion of the video, graphical, or textual information to be shown on the display 10. The face 20 of the display module 12 is aligned and oriented relative to faces 20 of one or more adjacently-positioned LED modules 12 so that the faces 20 combine to form the display surface 16 of the overall display 10 shown in FIG. 1. The plurality of display modules 12 are operated together in such a way as to display the video, graphical, or textual information in a cohesive manner so that the entire display 10 appears to a viewer as a single display that is larger than the individual display modules 12.

In an example, the LEDs 18 are arranged into an array of pixels 22 (best seen in FIG. 2). Each pixel 22 includes one or more LEDs 18 grouped together in close proximity. The proximity of the pixels 22 allows the display 10 to be operated in such a way that they will appear to a viewer of the display 10 to form recognizable shapes, such as letters or numbers to display textual information or recognizable shapes to display graphical or video information. In some examples, the plurality of LEDs 18 include a plurality of different-colored LEDs 18 such that different-colored LEDs 18 of each pixel 22 can be cooperatively operated to display what appears to be a spectrum of different colors for the viewer of the display 10. In an example, each pixel 22 includes a red LED 18, a green LED 18, and a blue LED 18, wherein the red, green, and blue LEDs of each pixel 22 cooperate to provide essentially the entire color spectrum that is visible to humans based on whether one, two, or all three of the LEDs 18 in a pixel 22 are lit, and at what intensities. The display 10 can also provide a black or empty looking surface over a portion of the display, when desired, by deactivating or turning off the LEDs in a designated area of pixels 22.

In an example, the pixels 22 are arranged in a grid-like array, such as a grid comprising a specified number of rows and a specified number of columns of the pixels 22. The display 10 can be controlled, for example with control software and/or one or more hardware controllers, so that visual information, e.g., video, graphical, or textual information, is broken down into coordinates. Each coordinate can correspond to a specific pixel location within the overall display 10, and the control software and/or the one or more hardware controllers can operate each pixel according to a program that specifies a condition for each coordinate within the display 10 and controls each of the pixels 22 so that it will appear to emit light that meets the condition specified. For example, if the display 10 is displaying a series of textual messages, the control software and/or the one or more hardware controllers can be fed the data corresponding to the series of textual messages, and the control software and/or the one or more hardware controllers can break the text of the messages down into conditions for each pixel 22, such as the time within the series of messages, the color that a pixel 22 is to display at that time (if the display 10 is a multi-colored display) and the intensity of the pixel 22 at that time. The control software and/or the one or more hardware controllers can also convert the information regarding color and intensity into specific operating parameters for each LED 18 in a particular pixel 22, such as the power that will be supplied to the red LED 18, the blue LED 18, and the green LED 18 in that pixel 22 and for how long in order to achieve the specified color and intensity at the specified time. The control software and/or the one or more hardware controllers can then send control signals to the pixels 22 or to individual LEDs 18 that can operate the pixels 22 according to the specified series of textual messages. Although a grid or grid-like array of LED pixels, as summarized above, is common, the display 10 described herein can use other arrangements of the LEDs 18 or other systems for addressing the LEDs 18 can be used without varying from the scope of the present invention.

Certain types of information displays are used in applications where high levels of uptime are desired. For example, transportation information displays are often operated continuously for long periods of time. The information being displayed on transportation information displays is often helpful, and often necessary, to maintain efficient usage of a large transportation network (i.e., a highway system for a metropolitan area). Failure of a particular display, or even just of one or more display modules of a display, can lead to incorrect or incomplete communication with the intended audience (i.e., motorist using the transportation system). Such failure can also adversely affect public perception of the infrastructure. Moreover, the logistical cost of repairing or replacing even a small number of failed displays in large-scale systems, such as in the highway network of a large metropolitan area, is cost prohibitive.

For these reasons, display systems where high uptime is desired, such as transportation displays, are often designed with built-in redundancy for one or more operational aspects so that if a primary component of the display fails, either a backup component can be activated to replace it, or an alternate pathway can be used to compensate for the failure. Ensuring this redundancy can be difficult, time-consuming, and expensive for manufacturers of displays and display systems (also referred to as a "display manufacturer") and for the display manufacturer's customers who install, maintain, or operate the displays or systems.

The difficulty in designing redundancy in displays and display systems can be exacerbated by the fact that displays include not only the hardware to display the visual information, i.e., the plurality of display modules 12 that make up the display 10, but also support architecture for operating the display 10. One example of this support architecture are power supplies to provide electrical energy to electrical components of the display 10 (also referred to as "display electrical components" or simply "display components" for brevity). Examples of electrical display components to which power supplies can provide electrical energy for the operation of the display 10 include, but are not limited to: one or more of the display modules 12 that make up the display surface 16, or one or more electrical components that support the operation of the display 10 (also referred to as "supporting components"), such as a cabinet fan to prevent or minimize overheating of the display modules 12.

Currently, the most common method of providing electrical power supply redundancy is through the design of power supply devices that include built-in redundancy within the power supply hardware itself (also referred to herein as a "built-in redundant power supply" or simply "redundant power supply"). Built-in redundancy must be designed and provided for by the power supply manufacturer. However, power supply manufacturers often charge a premium for their redundant power supplies, and often a substantial premium. Also, redundant power supplies are proprietary to each particular power supply manufacturer such that the display system must be specially designed for the redundant power supply from a particular power supply manufacturer in order to take advantage of the power supply redundancy of the redundant power supply.

The proprietary requirement of redundant power supplies minimizes the flexibility that a display manufacturer has in designing the display 10 and the display modules 12. In practical terms, it prevents the display manufacturer from modifying the design of the display 10 or the display modules 12 (also referred to herein as the "display design") and prevents the display manufacturer from substituting a different redundant power supply from a different power supply manufacturer without having to incur redesign costs and likely added capital costs to modify the manufacturer process to the new design of the display 10. The undesirable nature of this arrangement is apparent and pronounced. Most notably, it provides a substantial barrier to redesign for the display manufacturer away from a design that uses the originally-selected proprietary redundant power supply. This, in turn can give rise to several potential problems:

A. It gives the power supply manufacturer considerably more negotiating power over the display manufacturer and the display manufacturer's customers compared to a more typical arrangement between the component supplier and the customer. This potentially gives the power supply manufacturer control over the price it charges for the redundant power supply that is not commensurate with the redundant power supply's actual value in the marketplace. This can result in the power supply manufacturer charging an even higher premium than it already is for its proprietary redundant power supply, which in turn further amplifies the barrier to redesign for the display manufacturer.

B. It requires the display design, including the design of display components such as the display modules 12, to be finalized (at least with respect to how electrical energy is supplied to the display component) before a full understanding of the display 10 has been achieved. For example, at the time the redundant power supply is selected and the power receiving aspects of the display design are finalized, all aspects of mass manufacturing of the display components are not known. Nor is how the display 10 and the display components that make it up will behave when deployed in the field, at least not with 100% certainty. In other words, what may seem like the most desirable design for the display components at the beginning of the process might turn out to be undesirable as manufacturing or operational problems are discovered. When these later-discovered problems include a discovery that the particular redundant power supply selected was unfit for the specifics of the display 10, it may require costly redesign of the display 10 overall or of one or more individual display components, such as the display modules 12.

C. Even if later-discovered problems do not occur and even if the power supply manufacturer does not abuse its stronger negotiating position, the display manufacturer can still run into similar problems if the power supply manufacturer goes out of business or decides to discontinue the particular model of redundant power supply selected and if the new offerings of redundant power supplies are not compatible with the current display design. This will still require the selection of a new redundant power supply and a full redesign of the power supply aspects of the display design. Moreover, once a new redundant power supply is selected and the display design is updated, it would result in the same potential problems described above (e.g., increased negotiating power for the newly selected power supply manufacturer over the display manufacturer and its customers and the problem of having to select a final power supply design before al aspects of the manufacturing and operational conditions are known).

Figure 3:
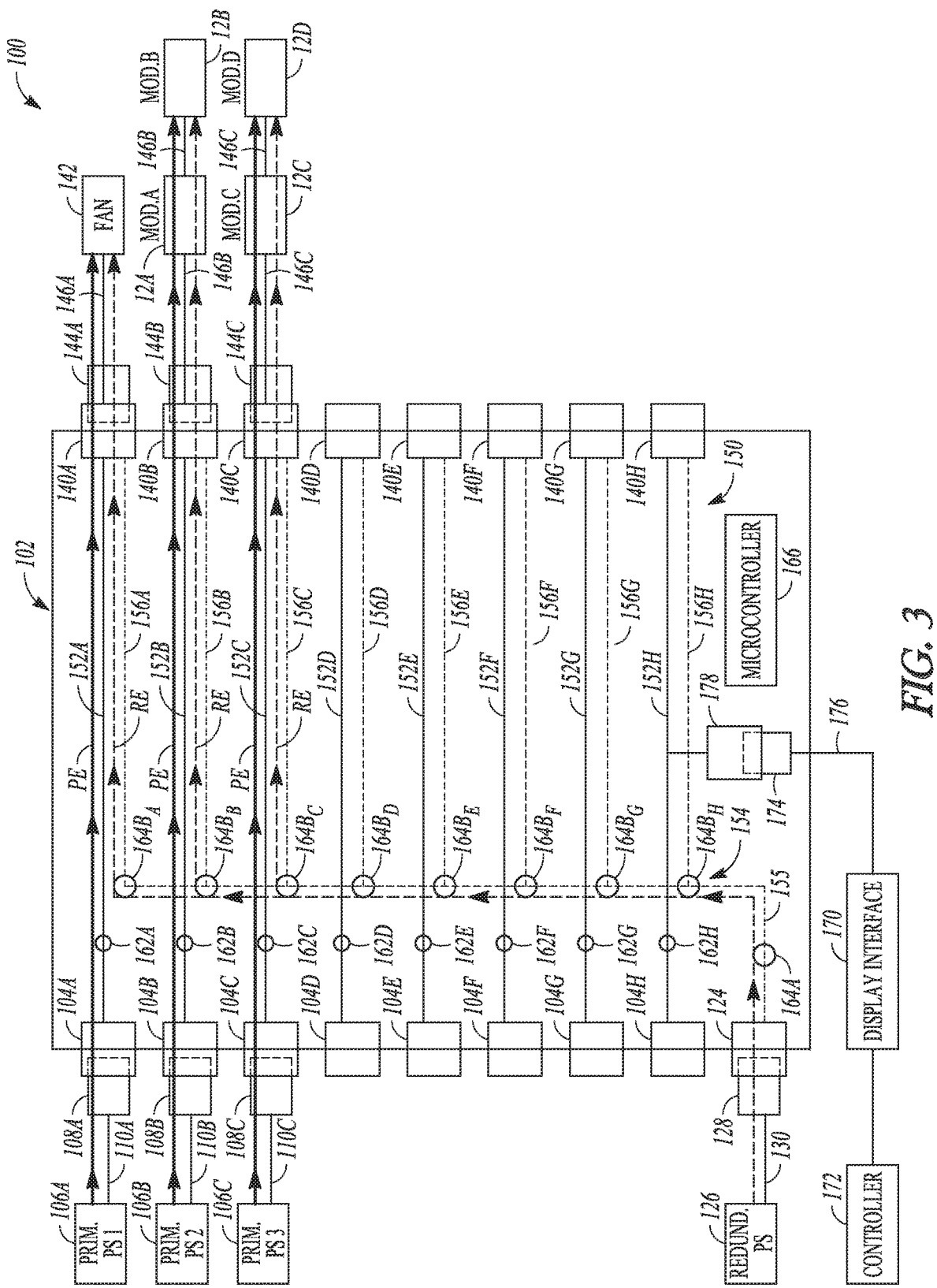
FIG. 3 is a conceptual block diagram of a power supply redundancy system that can be used to provide redundant power supply to multiple components of a light-emitting display system.

FIG. 3 shows an example of a power-supply redundancy system 100 (also referred to as "power redundancy system 100" or "redundancy system 100") that provides for power supply redundancy to one or more display components, such as those corresponding to the example display 10 of FIG. 1. As described in more detail below, the redundancy system 100 provides for this power supply redundancy without necessitating the use of proprietary power supplies with built-in power supply redundancy from any particular power supply manufacturer. In particular, the redundancy system 100 allows the use of any generic power supply that can provide the specific power output specifications for the display components being powered (e.g., the display modules 12 or a cabinet fan to cool the display modules 12) without needing the power supply to have built-in redundancy at all. Moreover, as described below, in some examples, the redundancy system 100 can receive power from any generic power supply hardware regardless of the internal configuration of the generic power supply, so that the redundancy system 100 is not dependent on any particular proprietary configuration of power supply and the redundancy system 100 does not have to be redesigned any time a new power supply is used. As such, the redundancy system 100 can minimize or eliminate each of the problems described above that are associated with proprietary power supplies with built-in redundancy.

To achieve this functionality, the redundancy system 100 includes a power redundancy enabling device 102 (also referred to as a "redundancy device 102"). In an example, the redundancy device 102 comprises a specially configured circuitry board, such as a printed circuit board (or "PCB"), with wiring or circuitry, or both, that enables the ability to provide redundant power supply even when using generic power supplies that do not possess built-in redundancy capabilities. As such, the redundancy device 102 will also be referred to herein as a "power redundancy board 102" or simply as the "redundancy board 102." Those of skill in the art will recognize that configurations other than a printed circuit board or even a single circuitry board will be possible without varying from the scope of the present disclosure.

As described in more detail below, the redundancy board 102 provides the ability to electrically connect each of a plurality of primary power supply devices to one or more corresponding display components. The redundancy board 102 also provides the ability to electrically connect one or more redundant power supplies to any one of the display components electrically connected to the redundancy board 102 should the flow of electrical energy between one of the primary power supplies and any of its corresponding display components be interrupted.

As used herein, the term "primary," when used with respect to power supply to one or more display components, refers to one or more power supplies and support components that are intended to be used during normal operation of the display 10. In other words, "primary" refers to those components that are intended to be used for power supply to the display components when everything in an electrical pathway between a primary power supply and its corresponding display component or components is operating properly. The term "primary" is used in contrast to the terms "redundancy" or "redundant," which are used to refer to power supply components that are intended to be used as a backup to the one or more of the primary power supplies and its (or their) primary power supply support components in the event that the transmission of electrical energy from a primary power supply to its corresponding one or more display components is interrupted. Examples of causes of interruption in electrical energy transmission between a primary power supply and its corresponding display component or components include, but are not necessarily limited to, one or any combination of: failure of the primary power supply itself; failure of one or more of the primary power supply support components between the primary power supply and the corresponding display component or components; or a defect in the conductive pathway between the primary power supply and its corresponding display component or components.

In other words, "redundant" or "redundancy" refers to power supply components that are intended to be used for power supply to one or more display components, such as one or more display modules 12, when the delivery of electrical energy from a primary power supply is interrupted. When this interruption in the delivery of electrical energy from a primary power supply is detected, the redundancy system 100 activates the redundant power supply and directs the electrical energy that it supplies to the display component or components for which electrical energy supply was interrupted in place of the electrical energy that was meant to be coming from a primary power supply. The specifics of the how the redundancy system 100 detects the interruption of electrical energy from a primary power supply and switches to the redundant power supply, as well as further specifics of the redundancy system 100 and the redundancy board 102, are described in more detail below.

In the example shown in FIG. 3, the redundancy board 102 is able to connect as many as eight (8) total primary power supplies to eight (8) total display component groups, with each display component group comprising one or more specific display components that are each an electrical load for a specific one of the primary power supplies. Although eight (8) total connections between primary power supplies and corresponding display component groups are possible in the example shown in FIG. 3, only three (3) primary power supplies and three (3) display component groups are shown as being connected to the redundancy board 102. As described in more detail below, the redundancy board 102 is configured so that electrical energy from a first primary power supply connected to the redundancy board 102 at a first primary input position is directed to a first display component group that is connected to the redundancy board 102 at a corresponding first output position. Similarly, electrical energy from a second primary power supply that is connected to the redundancy board 102 at a second primary input position is directed to a second display component group that is connected to the redundancy board 102 at a corresponding second output position. The redundancy board 102 is further configured so that electrical energy from primary power supplies connected at third, fourth, fifth, sixth (and so on) primary input positions of the redundancy board 102 are each directed to corresponding third, fourth, fifth, sixth (and so on) output positions, respectively, for delivery to third, fourth, fifth, sixth (and so on) display component groups.

As is further described below, the redundancy board 102 is also configured to be able to direct or route electrical energy from any of the one or more redundant power supplies connected to the redundancy board 102 at a redundancy input position to any display component group that is connected to any output position in response to an interruption of the electrical energy supply from any of the primary power supplies. The redundancy board 102 or some other component of the redundancy system 100 can also be configured to detect when the transmission of electrical energy between a primary power supply and its corresponding display component group is interrupted and control activation of one or more of the redundant power supplies and the directing of electrical energy from the activated one or more redundant power supplies to the affected display component group.

Continuing with FIG. 3, the redundancy board 102 comprises a plurality of primary power supply input connector 104A, 104B, 104C, 104D, 104E, 104F, 104G, and 104H (collectively referred to as "primary power supply input connector 104" or "primary input connector 104") that are configured for electrical connection to a corresponding primary power supply 106A, 106B, and 106C (collectively referred to as "primary power supply 106") so that each primary input connector 104 can connect to and receive primary electrical energy PE from the corresponding primary power supply 106. In an example, each primary power supply input connector 104 comprises a port or other connection hardware that can cooperatively engage with a corresponding primary power supply output connector 108A, 108B, and 108C (collectively referred to as "primary power supply output connector 108"). This engagement provides electrical contact between the primary input connector 104 and an engaged primary power supply output connector 108 that is sufficient to transfer primary electrical energy PE from the primary power supply output connector 108 to the primary input connector 104. Each primary power supply output connector 108 is electrically connected to a corresponding one of the primary power supplies 106. In an example, each primary power supply output connector 108 is electrically connected to a distal end of a corresponding primary power supply output cable 110A, 110B, and 110C (collectively referred to as "primary power supply output cable 110" or "primary power supply output cables 110"), and an opposing proximal end of each primary power supply output cable 110 is electrically connected to a corresponding primary power supply 106. As will be appreciated by a person of ordinary skilled in the art, each primary power supply 106 receives primary electrical energy PE from an electrical energy source, such as a local or municipal power company. The primary electrical energy PE flows from the primary power supply 106 to the primary input connector 104, such as through the primary power output cable 110 to the primary power supply output connector 108 and then to the primary input connector 104 via the electrical contact between the primary power supply output connector 108 and the primary input connector 104.

The redundancy board 102 also includes at least one redundant power supply input connector 124 (also referred to as the "redundancy input connector 124") that is configured for electrical connection to a redundant power supply 126. The redundancy input connector 124 can be substantially similar to or identical to the primary input connector 104 as described above. Similarly, the redundant power supply 126 can be substantially similar to or identical to each primary power supply 106 as described above. For example, the redundancy input connector 124 can include a port or other connection hardware that cooperatively engages with a redundant power supply output connector 128. This engagement provides electrical contact between the redundancy input connector 124 and the redundant power supply output connector 128 that is sufficient to transfer redundant electrical energy RE from the redundant power supply output connector 128 to the redundancy input connector 124. The redundant power supply output connector 128 is electrically connected to the redundant power supply 126. In an example, the redundant power supply output connector 128 is electrically connected to a distal end of a redundant power supply output cable 130, and an opposing proximal end of the redundant power supply output cable 130 is electrically connected to the redundant power supply 126. The redundant power supply 126 can also be connected to the same electrical energy source as the primary power supplies 106 so that when it is needed, a redundant electrical energy RE will flow from the electrical energy source to the redundant power supply 126 and then from the redundant power supply 126 to the redundancy input connector 124, such as through the redundant power supply output cable 130 to the redundant power supply output connector 128 and then to the redundancy input connector 124 via the electrical contact between the redundant power supply output connector 128 and the redundancy input connector 124.

Continuing with FIG. 3, the redundancy board 102 includes a plurality of board output connectors 140A, 140B, 140C, 140D, 140E, 140F, 140G, and 140H (collectively referred to as "board output connector 140" or "board output connectors 140") that are each configured for electrical connection to one or more display components. Each board output connector 140 can connect to and deliver electrical energy (which can be either primary electrical energy PE from its corresponding primary power supply 106 or redundant electrical energy RE from the redundant power supply 126) to the corresponding display component or components connected to that particular board output connector 140. In the example shown in FIG. 3, each board output connector 140 is electrically connected to one (1) or two (2) display components, such as a cabinet fan 142 connected to a first board output connector 140A, a first display module 12A and a second display module 12B connected (In series) to a second board output connector 140B, and a third display module 12C and a fourth display module 12D connected (in series) to a third board output connector 140C. FIG. 3 also shows that the redundancy board 102 can function even if one or more of the board output connectors 140 are not connected to any display components (and similarly if one or more of the primary input connectors 104 are not connected to a primary power supply 106), such as the fourth, filth, sixth, seventh, and eighth board output connectors 140D, 140E, 140G, and 140H that are not connected to a display component and the corresponding fourth, fifth, sixth, seventh and eighth primary input connectors 104D, 104E, 104F, 104G, and 104H that are not connected to a primary power supply 106.

Those of skill in the art will appreciate, however, that the board output connectors 140 and the redundancy board 102 are not limited to only one or two display components being electrically connected to a particular board output connector 140 or that the connection be in the same way shown in FIG. 3 (e.g., the connection need not be in series), and rather will understand that the specific display components and the number of display components connected to a particular board output connector 140 is limited only by the capability of the redundancy board 102 to supply sufficient electrical energy within the specifications required for a particular display component to function. For example, if a particular connection configuration (such as the number of display components, type of display component or components, and the type of connection (e.g., in series or in parallel)) is able to deliver electrical energy to each display component that is within specification with respect to voltage, current, frequency (in the case of alternating current ("AC")), or any other electrical specification provided for each display component connected to a particular board output connector 140, then that connection configuration can be used with the redundancy board 102.

In an example, each board output connector 140 comprises a port or other connection hardware that can cooperatively engage with a corresponding component input connector 144A, 144B, and 144C (collectively referred to as "component input connector 144" or component input connectors 144). This engagement provides electrical contact between the board output connector 140 and an engaged component input connector 144 that is sufficient to transfer electrical energy (either primary electrical energy PE or redundant electrical energy RE) from the board output connector 140 to the component input connector 144. Each component input connector 144 is electrically connected to one or more corresponding display components. In an example, each component input connector 144 is electrically connected to a distal end of a corresponding component power input cable 14A, 1468B, or 146C (collectively referred to as "component input cable 146" or "component input cables 146"), and each component input cable 146 is electrically connected to one or more corresponding display components. In the example shown in FIG. 3, the cabinet fan 142 is electrically connected to a first component input cable 146A, which is electrically connected to the redundancy board 102 by the engagement between the first board output connector 140A and a first component input connector 144A on the cable 146A. Similarly, in FIG. 3, the first and second display modules 12A and 12B are electrically connected to a second component input cable 1468B, which is electrically connected to the redundancy board 102 by the engagement between the second board output connector 140B and a second component input connector 144A on the cable 146B. A series cable 148B can also be included to electrically connect the first display module 12A in series to the second display module 12B. Finally, in the example shown in FIG. 3, the third and fourth display modules 12C and 12D are electrically connected to a third component input cable 146C, which is electrically connected to the redundancy board 102 by the engagement between the third board output connector 140C and a third component input connector 144C on the cable 146C. Another series cable 148C can be include to electrically connect the third display module 12C in series to the fourth display module 12D.

The redundancy board 102 also includes a plurality of integrated electrical pathways 150. The plurality of integrated electrical pathways 150 on the redundancy board 102 will be referred to as "wiring 150" for simplicity and brevity, even though those of skill in the art will appreciate that the pathways 150 can be formed without structures that are normally thought of as "wiring" or "wires," such as printed traces or other electrically-conductive structures. The wiring 150 includes a plurality of primary electrically-conductive pathways 152A, 152B, 152C, 152D, 152E, 152F, 152G, 152H (collectively referred to as "primary pathway 152" or "primary pathways 152," for brevity), with each primary pathway 152 being formed between a corresponding primary input connector 104 and a corresponding board output connector 140. In an example, each of the primary pathways 152 are formed from one or more wires, one or more traces, or one or more other electrically-conductive structures, or any combination thereof, which are electrically connected together to each other, for example in series, with a first end that is electrically connected to a corresponding primary input connector 104 and a second end electrically connected to a corresponding board output connector 140.

In the example shown in FIG. 3, the redundancy board 102 includes a total of eight (8) primary pathways 152: a first primary pathway 152A between the first primary input connector 104A and the first board output connector 140A; a second primary pathway 152B between the second primary input connector 104B and the second board output connector 140B; a third primary pathway 152C between the third primary input connector 104C and the third board output connector 140C; a fourth primary pathway 152D between the fourth primary input connector 104D and the fourth board output connector 140D; a fifth primary pathway 152E between the filth primary input connector 104E and the fifth board output connector 140E; a sixth primary pathway 152F between the sixth primary input connector 104F and the sixth board output connector 140F; a seventh primary pathway 152G between the seventh primary input connector 104G and the seventh board output connector 140G; and an eighth primary pathway 152H between the eighth primary input connector 104H and the eighth board output connector 140H.

Each primary pathway 152 is capable of receiving primary electrical energy PE from a corresponding primary power supply 106 connected to a corresponding primary input connector 104 and conduct the primary electrical energy PE along the primary pathway 152 to a corresponding board output connector 140 so that the primary electrical energy PE can be delivered to one or more display components electrically connected to the corresponding board output connector 140. For example, as shown in the example of FIG. 3, the first primary pathway 152A can receive primary electrical energy PE supplied by the first primary power supply 106A that is electrically connected to the first primary input connector 104A and deliver it to the cabinet fan 142 that is electrically connected to the first board output connector 140A. Similarly, the second primary pathway 152B electrically connects the second primary power supply 106B (connected to the second primary input connector 104B) to the first and second display modules 12A and 12B (connected in series to the second board output connector 140B) to deliver primary electrical energy PE from the second primary power supply 106B to the display modules 12A and 12B. Finally, in the example shown in FIG. 3, the third primary pathway 152C electrically connects the third primary power supply 106C (connected to the third primary input connector 104C) to the third and fourth display modules 12C and 12D (connected in series to the third board output connector 140C) to deliver primary electrical energy PE from the third primary power supply 106C to the display modules 12C and 12D.

The wiring 150 of the redundancy board 102 also provides a redundant conductive pathway tree 154 (also referred to as "redundant pathway tree 154" for brevity). The redundant pathway tree 154 provides the ability to deliver redundant electrical energy RE provided by the redundant power supply 126 to any of the board output connectors 140 if it is needed to replace the primary electrical energy PE from a particular primary power supply 106 that has been interrupted to a corresponding board output connector 140. In an example, the redundant pathway tree 154 comprises a plurality of alternative and redundant electrically-conductive pathway branches 156A, 156B, 156C, 156D, 156E, 156F, 156G, or 156H (collective referred to as "redundant pathway branches 158" or simply "redundant pathway 156") each providing an alternative electrical pathway between the redundancy input connector 124 and one of the board output connectors 140. In an example, the redundant pathway tree 154 is formed from a plurality of wires, traces, or other electrically-conductive structures, or any combination thereof, which are electrically connected together in a network that forms conductive pathways in the desired configuration of the redundant pathway tree 154 (i.e., to form each of the redundant pathway branches 156), with a common proximal end of the redundant pathway tree 154 (e.g., a "trunk portion 155" of the tree) that is electrically connected to the redundancy input connector 124, and a distal end of each redundant pathway branch 156 of the redundant pathway tree 154 (e.g., the branches of the tree) that is electrically connected to a corresponding board output connector 140.

Alternatively, rather than having a redundant pathway tree 154 with a single electrical connection to the redundancy input connector 124 that branches out into separate redundant pathway branches 156, the redundancy board 102 can be configured to include individual redundancy pathways for each board output connector 140, similar to the separate primary pathways 152 except that rather than having a separate input connector and output connector for each pathway (as with the primary input connector 104 and board output connector 140 on either end of the primary pathway 152), each separate redundant pathway can be separately connected to the redundancy input connector 124 at a first end (such as with separate traces coming in to contact a different part of the redundancy input connector 124) and to a different corresponding board output connector 140 at a second end.

In the example shown in FIG. 3, the redundancy board 102 includes a total of eight (8) different potential redundant pathway branches 156 through the redundant pathway tree 154, similar to the primary pathways 152, with each redundant pathway branch 156 each originating at the redundancy input connector 124: a first redundant pathway branch 156A to the first board output connector 140A; a second redundant pathway branch 156B to the second board output connector 140B; a third redundant pathway branch 156C to the third board output connector 140C; a fourth redundant pathway branch 156D to the fourth board output connector 140D; a fifth redundant pathway branch 156E to the fifth board output connector 140E; a sixth redundant pathway branch 156F to the sixth board output connector 140F; a seventh redundant pathway branch 156G to the seventh board output connector 140G; and an eighth redundant pathway branch 156H to the eighth board output connector 140H.

In an example, the wiring, traces, or other electrically-conducting structures that make up one or more of the primary pathways 152 is completely separate and electrically insulated from the entirety of the wiring, traces, or other electrically-conducting structures that form a corresponding redundant pathway branch 156 so that if it is the primary pathway 152 itself that falls (for example due to cracking or some other defect that develops along the primary pathway 152) that failure will not affect an individual redundant pathway branch 156 or the redundant pathway tree 154 as a whole.

Which of the branched redundant pathways 156 in the redundant pathway tree 154 that is used (or which of the separate redundant pathways in the alternative redundancy wiring described above), or if one is used at al, will depend on where the primary electrical energy PE is interrupted. For example, if it is detected that the primary electrical energy PE between the first primary power supply 106A and a display component connected to the first board output connector 140A is interrupted (i.e., a failure in the first primary power supply 106A or along the first primary pathway 152A), then the redundancy system 100 will activate the redundant power supply 126 (if needed), and the wiring 150 will be configured to direct the redundant electrical energy RE along the first redundant pathway branch 156A to the first board output connector 140A. Similarly, if it is detected that the primary electrical energy PE between the second primary power supply 106B and a display component connected to the second board output connector 140B is interrupted (i.e., a failure in the second primary power supply 106B or along the second primary pathway 152B), then the redundancy system 100 will activate the redundant power supply 126 (if needed), and the wiring 150 will be configured to direct the redundant electrical energy RE along the second redundant pathway branch 156B to the second board output connector 140B. Similar detection and switching to any of the other redundant pathway branches 156 in response to a failure from any of the other primary power supplies 106 or along any of the other primary pathways 152 can also be performed by the redundancy system 100.

The redundancy system 100 can also include one or more electronic devices that are configured to provide certain functionality to the redundancy system 100. In an example, the one or more electronic devices can include one or more integrated circuits or other logic that is configured to perform one or both of: detecting an interruption of primary electrical energy PE; or switching between a primary pathway 152 and a corresponding redundant pathway branch 156. The integrated circuits or other logic will be referred to as "IC" or "ICs" for brevity even though it is to be understood that other types of logic or electronic devices can be used to perform the functions of the ICs. In an example, the redundancy board 102 includes a plurality of ICs with each of the plurality of ICs being configured to perform at least one particular function at a particular location on the redundancy board 102. In general, each particular IC is electrically connected to a portion of wiring, a trace, or another electrically-conductive structure that makes up one or more of the primary pathways 152 or a part of the redundant pathway tree 154.

Each particular IC can be configured to perform one or more of the functions described above for the entirety of the ICs. For example, an IC can be configured to monitor the wiring, trace, or other electrically-conductive structure that the IC is connected to and determine if electrical energy is passing through it. If the wiring, trace, or electrically-conductive structure being monitored by the IC is along a primary pathway 152, then the IC is configured to determine if primary electrical energy PE is flowing through that particular pathway 152. An IC can also be configured to either break (i.e., open) or complete (i.e., close) the electrical connection along the wiring, trace, or electrically-conductive structure that the IC is connected so that the IC acts as a switch that will either allow the electrical energy to flow through the wiring, trace, or electrically-conductive structure or not. In some examples, an IC can be positioned at a junction where a first portion of wiring, trace, or other electrically-conductive structure meets a second portion of wiring, trace, or other electrically-conductive structure. In some examples, a third and even fourth or fifth portions of wiring, traces, or other electrically-conductive structures also meet at the Junction. The IC at the Junction can be configured to direct which of the portions of wiring, traces, or other electrically-conductive structures will be a source of electrical energy into the Junction and which of the portions of wiring, traces, or other electrically-conductive structures will be able to flow electrical energy out of the junction so that the IC can act as a directional switch that directs flow of electrical energy along a particular pathway or pathway branch (such as along one of the redundant pathway branches 156).

In an example, the plurality of ICs can include one or more primary ICs 162 electrically connected to the primary pathways 152 (such as one or more first primary ICs 162A along the first primary pathway 152, one or more second primary ICs 162B along the second primary pathway 152B, and so on). In an example, the primary ICs 162 can be configured to monitor at least one point along each primary pathway 152 to either confirm that primary electrical energy PE is flowing through the primary pathway 152 or to detect that the primary electrical energy PE has been interrupted. In an example, the one or more primary ICs 162 are configured to monitor the voltage across the primary pathway 152 that they are monitoring. In order to illustrate this functionality, the use of one or more primary ICs 162A will be described with respect to the first primary pathway 152A. The one or more first primary IC 162A can be positioned along the first primary pathway 152A if the first primary ICs 162A measure a voltage drop across the first primary IC 162A (rather than a zero voltage), then it can assume that at least some primary electrical energy PE is flowing through the first primary pathway 152A A plurality of the first primary ICs 162A can be positioned at different positions along the first primary pathway 152A and the voltage across the entirety of the first primary pathway 152 can also be determined, which can be compared to an expected voltage across the first primary pathway 152A when the first primary power supply 106A and the first primary pathway 152A are operating property. If the voltage across the first primary pathway 152A varies from the expected voltage by more than a specified threshold, the first primary ICs 162A can determine that there is a malfunction along the first primary pathway 152A or in the first primary power supply 106A.

The redundancy board 102 can include similar setups of primary ICs 162A-162H on each of the other primary pathways 152B-152H. The primary ICs 162 associated with each specific primary pathway 152 can independently monitor each primary pathway 152. This allows the redundancy system 100 to determine not only that there is an interruption of the primary electrical energy PE somewhere in the system, but also to determine which primary pathway 152, and thus which primary power supply 106 and which set of display components, are being affected. In short, when configured in this way, the primary ICs 162 can act as diagnostic devices that can (a) monitor the system to determine that a failure in primary electrical energy PE has occurred, and (b) identify where the interruption of the primary electrical energy PE has occurred, at least down to the level of which combination of primary power supply 106, primary input connector 104, and primary pathway 152 is failing to supply sufficient primary electrical energy PE. Thus, this configuration of primary ICs 162 can determine which board output connector 140, and thus which display components connected to that board output connector 140, need to have the interrupted primary electrical energy PE replaced with redundant electrical energy RE, which can be used to determine which redundant pathway branch 156 should be used to supply the redundant electrical energy RE to that board output connector 140.

The one or more primary ICs 162 can also be configured to break the electrical connection through the primary pathway 152 being monitored (i.e., open the electrical circuit or "switch off" of the primary pathway 152). This scenario will be illustrated by describing its operation with respect to the second primary pathway 152B, i.e., if it is determined that that there is a failure or interruption in primary electrical energy PE through the second primary pathway 152B. If the failure or interruption necessitates switching to the corresponding second redundant pathway branch 156B to minimize interruption of electrical energy delivery to the second board output connector 140B (and thus to minimize downtime of the display component or components connected to the second board output connector 140B), then one or more second primary ICs 162B can be configured to switch off the second primary pathway 152B. The switching off of the second primary pathway 152B can be performed before the corresponding second redundant pathway branch 156B is connected between the redundancy input connector 124 and the second board output connector 140B. This switching off of the primary pathway 152B can prevent a situation where both the primary power supply 106B and the redundant power supply 126 are supplying electrical energy to the same board output connector 140B (and thus can prevent both primary electrical energy PE and redundant electrical energy RE being supplied to the display components connected to the board output connector 140B). For example, if, after switching to the redundant pathway branch 156B to provide redundant electrical energy RE to the board output connector 140B, the cause of the failure or interruption of primary electrical energy PE along the primary pathway 152B is remedied while redundant electrical energy RE is still being supplied along the corresponding redundant pathway branch 156B, the primary ICs 162B switching off of the primary pathway 152B prevents primary electrical energy PE from also being delivered until after the redundant pathway branch 156B is shut off. Switching off the affected primary pathway 152B can also prevent leakage of the redundant electrical energy RE into the second primary pathway 152B, which can reduce the redundant electrical energy RE that is supplied to the board output connector 140B and to the one or more display components connected to the board output connector 140B and could also undesirably flow back through the second primary pathway 152B and potentially damage components electrically connected to the second primary pathway 152B.

In an example, the plurality of ICs includes a plurality of redundant ICs 164 along the redundant pathway tree 154. The plurality of redundant ICs 164 can be positioned at specified positions within the redundant pathway tree 154. The plurality of redundant ICs 164 can be included in addition to or in place of the primary ICs 162 described above.

Like the primary ICs 162, one or more of the redundant ICs 164 can be configured to monitor a particular portion of the redundant pathway tree 154 (such as a wire, trace, or other electrically-conductive structure associated with a portion of a particular redundant pathway branch 156) to determine if redundant electrical energy RE is flowing through the monitored portion. The main functions of the redundant ICs 164, however, are to perform at least one of, in some examples at least two of, in some examples at least three of, and in some examples all of the following functions:

(1) completing an electrical connection through the redundant pathway tree 154, i.e., by closing a circuit through the redundant pathway tree 154, or "turning on" the redundant pathway tree 154, when a failure or interruption in the supply of primary electrical energy PE is detected;

(2) breaking the electrical connection through the redundant pathway tree 154, i.e., "turning off" the redundant pathway tree 154, when a failure or interruption in the primary electrical energy PE is not detected or when it is determined that the redundant electrical energy RE is no longer needed (i.e., that the failure in the primary pathway 152 has been remedied);

(3) routing the redundant electrical energy RE provided by the redundant power supply 126 to the proper board output connector 140, I.e., the board output connector 140 to which it has been determined that the primary electrical energy PE has been interrupted, by connecting up the redundant pathway branch 156 that corresponds to that board output connector 140 so that it forms a continuous conductive pathway between the redundancy input connector 124 and that board output connector 140; and (4) breaking the electrical connection through a specific redundant pathway branch 156, i.e., "turning off" that redundant pathway branch 156, such as when it is determined that the redundant electrical energy RE should no longer be supplied to the board output connector 140 corresponding to that redundant pathway branch 156, for example, if the control logic of the ICs or another controller determines that the primary electrical energy PE can be resumed or that the primary electrical energy PE has been interrupted to a different board output connector 140 with higher priority.

In an example, shown in FIG. 3, the redundant ICs 164 include more than one type of IC, with each type being loosely defined based on the function it performs. One type of IC that the redundant ICs 164 can include are one or more on-and-off type switching ICs (also referred to as "on/off switch ICs") that are connected to a portion of the redundant pathway tree 154 and are configured to complete or break the electrical connection through the connected portion, i.e., to switch the portion of the redundant pathway tree 154 where the on/off switch ICs can be in an "on" state (providing a pathway for the redundant electrical energy RE through the connected portion) or an "off" state (breaking the pathway through the connected portion and preventing the redundant electrical energy RE from passing therethrough). In particular, the term "on/off switch IC" will be used herein to refer to the on-and-off type of switching IC 64A (shown in the example of FIG. 3) that is connected to the portion of the redundant pathway tree 154 proximate to the redundancy input connector 124 (i.e., the trunk portion 155). When the on/off switch ICs 164A is in the "off" state, an electrical circuit cannot be completed through the redundant pathway tree 154, which prevents the redundant electrical energy RE from being able to flow through the redundant pathway tree 154 at al. When the on/off switch ICs 164A is in the "on" state, it forms an electrical connection through the trunk portion 155 of the redundant pathway tree 154, and allows the redundant electrical energy RE to be activated and flow through the redundant pathway tree 154, although to do so, the other redundant ICs 164 in the redundant pathway tree 154 must be configured in a way that a complete electrically-conductive pathway forms between the redundancy input connector 124 and one of the board output connectors 140. In this way, the on/off switch ICs 164A can perform the first two main functions of the redundant ICs 164 described above, i.e., completing the electrical connection when the redundant electrical energy RE is needed (i.e., "turning on" the redundant pathway tree 154) and breaking the electrical connection when the redundant electrical energy RE is not needed (i.e., turning off the redundant pathway tree 154).

Another type of IC that can be included in the redundant ICs 164 is a routing-switch type of IC 164B (also referred to as "routing switch ICs 164B") that can be connected to a junction. As used herein, the term "Junction" refers to a point on the redundancy board 102 where two or more electrical pathways come together (i.e., electrical energy can flow into the junction from two or more possible input pathways) or a point from which two or more pathways leave (i.e., electrical energy can flow out of the junction into two or more possible output pathways), or both. A routing switch IC 164B can be switched between different configurations, with each configuration corresponding to the allowing of current to flow into a junction from a specified subset of all the possible input pathways and out of the Junction from a specified subset of all the possible output pathways. In its simplest form, each configuration of the routing switch IC 164B allows current to flow into the junction through only one of the possible input pathways and allows current to flow out of the junction through only one of the possible output pathways. In the example shown in FIG. 3, each routing switch IC 164B includes only a single input pathway into the routing switch IC 164B and two possible output pathways that the routing switch IC 164B can switch between in order to route the redundant electrical energy RE along a desired redundant pathway branch 156. The routing switch ICs 164B shown in FIG. 3 are labeled with a subscript letter indicating down which of the redundant pathway branches 156 the routing switch IC 164B can route the redundant electrical energy RE. For example the routing switch IC 164B that can route the redundant electrical energy RE down the first redundant pathway branch 156A is labeled as "$164B_A$," the one for the second redundant pathway branch 156B is labeled as "$164_B$" and so on.

As used above, the term "type" when referring to the redundant ICs 164 refers only to the function that a particular IC performs, and not to any specific architecture or structure of the IC in question. Moreover, a specific IC may be referred to as one "type" of IC, but it might actually perform more than one of the functions described. For example, a particular IC might be able to be labeled as a routing switch IC 164B because it performs the function of switching between more than one potentially pathway for the redundant electrical energy RE, but the same redundant IC 164 might also perform the function of switching one or more of the potential pathways on or off, and thus could also be labeled as an on/off switch IC 164A. In such a case, the IC in question is both an on/off switch IC 164A and a routing switch IC 164B. Similarly, in some examples, a single IC might perform one or more functions on each of one or more of the primary pathways 152 and also perform one or more functions on the redundant pathway tree 154 so that that particular IC can be considered both a primary IC 162 and a redundant IC 164.

Each particular IC (i.e., each primary IC 162 and each redundant IC 164) can have any specific logic configuration that is capable of performing the desired function for that particular IC and no IC is limited to any particular circuit logic. Examples of logic configurations that can be used to perform one or more of the functions described above for the ICs, i.e., for the primary ICs 162 or the redundant ICs 164, or both, include, but is not limited to: a basic OR circuit (also sometimes referred to as an OR gate), a N+1 configuration, a combination of an OR gate and an N+1 configuration (such as an OR of N+1 buses), a parallel gate configuration, or a back-to-back configuration. Each IC is also not limited to any particular circuit technology or combination of technologies that can be used to provide a particular function for the IC, Examples of circuit technologies that can be used to form one or more of the ICs (including one or more of the primary ICs 162 and one or more of the redundant ICs 164) include, but are not limited to: a diode or other passive device, or an active device (also referred to as a transistor), such as a field-effect transistor (FET) (i.e., a metal-oxide semiconductor field-effect transistor (MOSFET)) or a bipolar junction transistor (BJT), a thyristor, or a composite transistor.

In an example, one or more of the ICs, and in some examples all of the ICs including the primary ICs 162 and the redundant ICs 164, are configured such that they automatically perform one or any combination of the functions described above. For example, any one of the ICs can include instructions that are encoded in the firmware of the IC to perform the functions needed for one or any combination of the functions described above.

The operation of any of the ICs described above, such as the primary ICs 162 or the redundant ICs 164, to perform one or any combination of the IC functionalities described above can optionally be performed under the control of at least one control device. For example, the control device can control the operation of the primary ICs 162 as they perform one or any combination of monitoring the primary pathways 152, determining if there is an interruption of the primary electrical energy PE between one of the primary power supplies 106 and its corresponding display component or components, or breaking the electrical connection through a particular primary pathway 152 (i.e., "turning off" the particular primary pathway 152). In addition to or in place of this control over the primary ICs 162, the control device can control the operation of the redundant ICs 164 as they perform one or any combination of: completing an electrical connection through the redundant pathway tree 154 (i.e., "turning on" the redundant pathway tree 154), breaking the electrical connection through the redundant pathway tree 154 (i.e., "turning off" the redundant pathway tree 154), routing the redundant electrical energy RE to the desired redundant pathway branch 156, or breaking an electrical connection to a particular redundant pathway branch 156 (i.e., "turning off" the particular redundant pathway branch 156).

Examples of devices that can be configured as a control device include, but are not limited to, a microcontroller 166 mounted to the redundancy board 102, or another device that is external to the redundancy board 102, such as the display interface 170 or the display controller 172 (both described in more detail below), or even a device that is external to the display 10, such as a remote controller or system administrator.

The use of one or more control devices can be in addition to or in place of one or more of the ICs performing one or more functions automatically, such as with firmware encoding. For example, rather than a particular IC performing its intended function automatically, a control device can be a master controller and that IC can be a slave that follows the instructions of the control device. In another example, a particular IC night automatically perform some of the functions needed for a particular functionality, such as monitoring a pathway or component to determine if electrical energy is flowing, but the control device might make the final determination that an action should be taken, such as a determination that the primary electrical energy PE has been interrupted along a particular primary pathway 152 and the instructions to a primary IC 162 to "turn off" that primary pathway 152 and to a corresponding one or more of the redundant ICs 164 to "turn on" the redundant pathway tree 154 and route redundant electrical energy RE to a corresponding redundant pathway branch 156. In another example, a first group of one or more of the ICs can be configured to perform all functions automatically and outside the control of the control device, while a second group of one or more ICs can be configured to be completely under the control of a control device in a master/slave configuration. In still another example, one or more of the ICs, and in some cases, all of the ICs, can be configured to automatically perform some or all of the functionalities described above during normal operation, but are subject to being overridden by an Instruction from the control device. In yet another example, the control device might be in control during normal operation, but its instructions are subject to override by one or more of the ICs if certain conditions are met that are measured and determined by the one or more ICs.

As described above, in some examples one or more of the primary ICs 162 can be configured with the ability to monitor each of the primary pathways 152 and determine if primary electrical energy PE has been interrupted along any of the primary pathways 152. In some examples, however, detection of an interruption of the primary electrical energy PE between a primary power supply 106 and its corresponding display component or components can be performed by monitoring and diagnostic electronics that are separate from the primary ICs 162. Examples of electrical devices that can be configured as monitoring and diagnostic electronics include, but are not limited to, the microcontroller 166 or a device that is external to the redundancy board 102, such as the display interface 170 or the controller 172 (described below) or another device that may be part of the display 10 or external to the display 10. In some examples, the same device or devices can act both as the control device (described above) that partially or completely controls operation of one or more of the ICs, and as monitoring and diagnostic electronics. For example, one or both of the microcontroller 166 or the display interface 170 can perform control of one or more of the ICs and the monitoring and diagnostic functions.

In some example, the monitoring and diagnostic electronics monitor the primary pathways 152 themselves in much the same way as described above with respect to the primary ICs 162, such as through the use of one or more sensors configured to determine if the primary electrical energy PE has been interrupted. In an example, these sensors measure the voltage across each primary pathway 152, which the monitoring and diagnostic electronics use to determine whether the primary electrical energy PE has been Interrupted through any particular primary pathway 152. In other examples, the monitoring and diagnostic electronics can determine if there is an interruption in the primary electrical energy PE by monitoring something other than the primary pathways 152, such as by monitoring (such as through the use of one or more sensors) at least one of: one or more of the primary power supplies 106, one or more of the primary power supply output cables 110, one or more of the primary power supply output connectors 108, one or more of the primary input connectors 104, one or more of the board output connectors 140, one or more of the component Input connectors 144, one or more of the component Input cables 146, or one or more of the display components themselves (e.g., one or more of the display modules 12 or the cabinet fan 142). At any particular one of these monitored components, the one or more sensors and the monitoring and diagnostic electronics can measure or determine one or any combination of the following electrical properties: a voltage across the component; a current flowing from, through, or to the component; or a power being supplied by or expended at the component.

If a specified one or more of the electrical properties that are measured falls below a specified threshold value, then the monitoring and diagnostic electronics can return a determination that the primary electrical energy PE between a particular primary power supply 106 and its corresponding display component or components has been interrupted. The monitoring and diagnostic electronics can communicate this determination to one or more of the ICs (such as the redundant ICs 164 to "turn on" the redundant pathway tree 154 and route the redundant electrical energy RE to the proper board output connector 140) or to one or more control devices that control operation of one or more ICs. In examples where the same devices or combination of devices can act as both monitoring and diagnostic electronics and as a control device, the determination of Interruption of primary electrical energy PE can trigger an instruction to the ICs to perform this same function.

The example redundancy board 102 is described above and shown in FIG. 3 as being configured for only a single redundant power supply 126 that connects to a single group of redundant pathways (e.g., those formed by the redundant pathway tree 154 and the redundant pathway branches 156). However, a redundancy system is not limited to only a single redundancy system. Rather, those of skill in the art can envision and implement, without undue experimentation, a redundancy board similar to the board 102 shown in FIG. 3, but that also includes a second redundancy power input connector in addition to the redundancy input connector 124, that can be connected to and electrically engaged with a second redundant power supply, such as via a second redundant power supply output connector. The second redundant power supply can also supply redundant electrical energy that can make up for an interruption in the primary electrical energy PE to one or more of the board output connectors 140.

In such a redundancy board, the wiring 150 would also include a plurality of second redundant electrical pathways each electrically connecting the second redundancy power input connector to a corresponding one of the board output connectors 140. For example, a second redundant pathway tree similar to the redundant pathway tree 154 could be included that corresponds to the second redundant input connector, where the second redundant pathway tree could also include a trunk portion that is electrically connected to the second redundancy input connector and spits into a plurality of redundant pathway branches similar to the redundant pathway branches 156 of the redundant pathway tree 154, with each redundant pathway branch of the second redundant pathway tree being electrical connected to a corresponding one of the board output connectors 140. The redundancy board of this example can also include an additional set of second redundant ICs that are similar or identical to the redundant ICs 164 except that they act on the second redundant pathway tree rather than the redundant pathway tree 154 that are acted on by the redundant ICs 164. The second redundant ICs could be configured to perform the same functions as described above for the redundant ICs 164, such as allowing the redundant electrical energy from the second redundant power supply to flow into the second redundant pathway tree and routing the redundant electrical energy from the second redundant power supply to the appropriate board output connector 140.

In one example where there is a second redundant power supply in addition to the first redundant power supply 126, the two redundant power supplies can provide more protection to the redundancy board and the redundancy system than a single redundant power supply 126. For example, Imagine an example scenario the first primary power supply 106A has already failed and interrupted the primary electrical energy PE to the first primary pathway 152A, such that the first redundant power supply 126 is already supplying its redundant electrical energy RE to the first board output connector 140A, and at a later time the primary electrical energy PE supplied by the third primary power supply 106C Is interrupted (such as due to a structural failure of the primary power supply output cable 110C between the third primary power supply 106C and the redundancy board 102). In such a scenario, the first redundant power supply 126 may not be capable of supplying redundant electrical energy RE that is sufficient to power both the display component or components connected to board output connector 140A (i.e., the cabinet fan 142 in FIG. 3) and to the display component or components connected to the board output connector 140C (i.e., the display modules 12C and 12D in FIG. 3). If that is the case, the single redundant power supply 126 may not be sufficient. But, in the example where the redundancy board can accommodate a second redundant power supply, the second redundant power supply can pick up the slack and provide redundant electrical energy to the third board output connector 140C when it is determined that the supply of the redundant electrical energy RE from first redundant power supply 126 to the first board output connector 140A means that the interruption of primary electrical energy PE from the third primary power supply 106C cannot be rectified by the first redundant power supply 126.

The first and second redundant power supplies can be coordinated to provide more complete coverage for the redundancy board. For example the redundancy system could be operated so that first redundant power supply 126 is assigned to a first subset of the primary pathways 152 while the second redundant power supply Is assigned to a second subset of the primary pathways 152, such that redundant electrical energy RE from the first redundant power supply 126 will only be supplied to the board output connectors 140 corresponding to the first subset and redundant electrical energy from the second redundant power supply would only be supplied to the board output connectors 140 corresponding to the second subset. Alternatively, the redundancy system can be configured to simply alternate between using the first and second redundant power supplies, with the first redundant power supply 126 supplying its redundant electrical energy RE when the first-in-time Interruption of primary electrical energy PE Is detected, and the second redundant power supply supplying its redundant electrical energy when the second-in-time Interruption of primary electrical energy PE is detected, regardless of which primary pathway 152 each Interruption occurs on for the first-in-time or second-in-time Interruptions.

As shown in FIG. 3, in an example the redundancy system 100 includes a device 170 that interfaces with controller hardware 172 (which is usually referred to as a "controller 172"). The controller 172 oversees operation of the display 10, including controlling the video, graphical, or textual information to be shown on the display 10 by controlling and coordinating the LEDs 18 of the display modules 12. For this reason, the device 170 will be referred to herein as a "display Interface 170." In an example, the primary function of the display interface 170 is as a signal converter for signals from the controller 172 into a form that is usable by the display modules 12 to control the LEDs 18 so that the display 10 will produce the desired video, graphical, or textual Information.

In the example shown in FIG. 3, the display interface 170 also connects to the redundancy board 102 via an interface connector 174, for example on a distal end of a display interface cable 176. In an example, the interface connector 174 comprises a port or other connection hardware that can cooperatively engage with a board interface connector 178. This engagement provides electrical contact between the interface connector 174 and the board interface connector 178. In an example, the electrical contact between the interface connector 174 and the board interface connector 178 is sufficient for the transfer of signals between the display interface 170 and the redundancy board 102. In an example, the signals transferred between the display interface 170 and the redundancy board 102 are diagnostic signals that are sent by the display interface 170 to analyze the performance of the redundancy board 102. In particular, the diagnostic signals can be generated to analyze whether the primary electrical energy PE has been interrupted between any of the primary power supplies 106 and one or more corresponding display components. In other words, the display interface 170 can be configured as monitoring and diagnostic electronics for the redundancy board 102, as described above.

In an example, the electrical contact between the interface connector 174 and the board Interface connector 178 is sufficient to provide for electrical energy to be transferred from the redundancy board 102 to the display Interface 170. In some examples, the electrical energy transferred from the redundancy board 102 to the display interface 170 is sufficient to power the operation of the display Interface 170. In an example, the electrical energy that is transferred to the display interface 170 from the redundancy board 102 is supplied from one of the primary power supplies 106, such as the primary power supply 106B or 106C in FIG. 3 that are configured to each power one or more display modules 12.

The above detailed description Includes references to the accompanying drawings, which form a part of the detailed description. The drawings show, by way of Illustration, specific embodiments in which the Invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of Inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" Includes "A but not B," "B but not A," and "A and B," unless otherwise indicated. In this document, the terms "including" and "In which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not Intended to impose numerical requirements on their objects.

Method examples described herein can be machine or computer-Implemented at least in part. Some examples can Include a computer-readable medium or machine-readable medium encoded with instructions operable to configure an electronic device to perform methods as described in the above examples. An Implementation of such methods can include code, such as microcode, assembly language code, a higher-level language code, or the like. Such code can Include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to Interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby Incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system comprising:
    a redundancy circuit board including:
        a plurality of primary power input connectors that each can connect to electrically engage with a primary power output from a corresponding primary power supply, wherein the corresponding primary power supply is configured to supply a primary electrical energy;
        a first redundancy power input connector that can connect to a first redundant power output from a first redundant power supply, wherein the first redundant power supply is configured to supply a first redundant electrical energy;
        a plurality of board output connectors that can each connect to and electrically engage with one or more electrical components of a display, the one or more electrical components configured to be powered by the primary electrical energy or the first redundant electrical energy;
        a plurality of electrical pathways comprising:
            a plurality of primary electrical pathways each electrically connecting one of the plurality of primary power input connectors to a corresponding one of the plurality of board output connectors; and
            a plurality of first redundant electrical pathways each electrically connecting the first redundancy power input connector to a corresponding one of the plurality of board output connectors; and
        one or more electrical devices configured to:

detect whether primary electrical energy from a first primary power supply has been interrupted along a first of the plurality of primary electrical pathways between a first of the plurality of primary power input connectors and a first of the plurality of board output connectors, detect whether primary electrical energy from a second primary power supply has been interrupted along a second of the plurality of primary electrical pathways between a second of the plurality of primary power input connectors and a second of the plurality of board output connectors, activate the first redundant power supply to supply the first redundant electrical energy to the first redundancy power input connector, direct the first redundant electrical energy along a first one of the plurality of first redundant electrical pathways that electrically connects to the first of the plurality of board output connectors when the one or more electrical devices detect that primary electrical energy from the first primary power supply has been interrupted along the first of the plurality of primary electrical pathways, and direct the first redundant electrical energy along a second one of the plurality of first redundant electrical pathways that electrically connects to the second of the plurality of board output connectors when the one or more electrical devices detect that primary electrical energy from the second primary power supply has been interrupted along the second of the plurality of primary electrical pathways.

2. The system according to claim 1, wherein the plurality of electrical pathways further comprises a redundant pathway tree comprising:
a trunk portion electrically connected to the first redundancy power input connector; and
a plurality of redundant pathway branches,
wherein each of the plurality of redundant pathway branches is electrically connected to the trunk portion at a first end and to a corresponding one of the plurality of board output connectors at a second end such that each of the plurality of first redundant electrical pathways is formed from the trunk portion and a corresponding one of the redundant pathway branches.

3. The system according to claim 1, wherein the one or more electrical devices comprises a plurality of integrated circuits mounted to the redundancy circuit board.

4. The system according to claim 3, wherein the plurality of integrated circuits comprises one or more first integrated circuits in electrical contact with each of the plurality of primary electrical pathways.

5. The system according to claim 4, wherein the one or more first integrated circuits are configured to perform at least one of:
monitoring each of the plurality of primary electrical pathways to determine if a flow of the primary electrical energy therethrough has been interrupted;
identifying through which of the plurality of primary pathways the primary electrical energy has been interrupted; or
breaking an electrical connection through one or more of the primary electrical pathways so that electrical energy cannot flow therethrough.

6. The system according to claim 3, wherein the plurality of integrated circuits comprises one or more second integrated circuits in electrical contact with each of the plurality of first redundant electrical pathways.

7. The system according to claim 6; wherein the one or more second integrated circuits are configured to perform at least one of:
directing the first redundant electrical energy along the first one of the plurality of first redundant electrical pathways to deliver the first redundant electrical energy to the first of the plurality of board output connectors; or
breaking an electrical connection through one or more of the first redundant electrical pathways.

8. The system according to claim 3, wherein the one or more electrical devices comprises a microcontroller mounted to the redundancy circuit board.

9. The system according to claim 8, further comprising a communication link for the transmission of information between the microcontroller and at least one of the plurality of integrated circuits, wherein the information comprises at least one of:
an electrical property associated with the first of the plurality of primary electrical pathways sent from the at least one of the plurality of integrated circuits to the microcontroller, or
a control signal from the microcontroller to the at least one of the plurality f the plurality of integrated circuits.

10. The system according to claim 9, wherein the electrical property comprises a voltage across one or more of the primary electrical pathways.

11. The system according to claim 9, wherein the control signal comprises at least one of:
an instruction to the at least one of the plurality of integrated circuits to measure the electrical property associated with the first of the primary electrical pathways; or
an instruction to the at least one of the plurality of integrated circuits to direct the first redundant electrical energy along the first one of the plurality of the plurality of first redundant electrical pathways.

12. The system according to claim 1, wherein the first primary power supply and the first redundant power supply are each manufactured by a corresponding power supply manufacturer such that the first primary power supply comprises a first proprietary electrical configuration and the first redundant power supply comprises a second propriety electrical configuration, and
wherein the redundancy board and the one or more electrical devices can detect whether the primary electrical energy has been interrupted along the first of the plurality of primary electrical pathways, activate the first redundant power supply, and direct the first redundant electrical energy along the first one of the plurality of first redundant electrical pathways regardless of the first proprietary electrical configuration or the second proprietary electrical configuration.

13. The system according to claim 1, further comprising:
the first primary power supply electrically connected to the first of the plurality of primary power input connectors;
the second primary power supply electrically connected to the second of the plurality of primary power input connectors;
the first redundant power supply electrically connected to the first redundancy power input connector;
one or more first electrical components of the display electrically connected to the first of the plurality of board output connectors; and one or more second electrical components of the display electrically connected to the second of the plurality of board output connectors.

14. The system according to claim 1, wherein the first primary power supply, the second primary power supply, and the first redundant power supply are each manufactured by a corresponding power supply manufacturer such that the first primary power supply comprises a first proprietary electrical configuration, the second primary power supply comprises a second propriety electrical configuration, and the first redundant power supply comprises a third proprietary electrical configuration; and wherein the redundancy circuit board and the one or more electrical devices can detect whether the primary electrical energy has been interrupted along the first of the plurality of primary electrical pathways, detect whether the primary electrical energy has been interrupted along the second of the plurality of primary electrical pathways, activate the first redundant power supply, direct the first redundant electrical energy along the first one of the plurality of first redundant electrical pathways, and direct the first redundant electrical energy along the second one of the plurality of first redundant electrical pathways regardless of the first proprietary electrical configuration, the second proprietary electrical configuration, or the third proprietary electrical configuration.

15. A system comprising:
a redundancy circuit board including:
a plurality of primary power input connectors that each can connect to electrically engage with a primary power output from a corresponding primary power supply wherein the corresponding primary power supply is configured to supply a primary electrical energy;
a first redundancy power input connector that can connect to a first redundant power output from a first redundant power supply, wherein the first redundant power supply is configured to supply a first redundant electrical energy;
a second redundancy power input connector that can connect to and electrically engage with a second redundant power output from a second redundant power supply, wherein the second redundant power supply is configured to supply a second redundant electrical energy;
a plurality of board output connectors that can each connect to and electrically engage with one or more electrical components of a display, the one or more electrical components configured to be powered by the primary electrical energy or the first redundant electrical energy;
a plurality of electrical pathways comprising:
a plurality of primary electrical pathways each electrically connecting one of the plurality of primary power input connectors to a corresponding one of the plurality of board output connectors;
a plurality of first redundant electrical pathways each electrically connecting the first redundancy power input connector to a corresponding one of the plurality of board output connectors;
a plurality of second redundant electrical pathways each electrically connecting the second redundancy power input connector to a corresponding one of the plurality of board output connectors; and
one or more electrical devices configured to:

detect whether primary electrical energy from a first primary power supply has been interrupted along a first of the plurality of primary electrical pathways between a first of the plurality of primary power input connectors and a first of the plurality of board output connectors,
activate the first redundant power supply to supply the first redundant electrical energy to the first redundancy power input connector,
direct the first redundant electrical energy along a first one of the plurality of first redundant electrical pathways that electrically connects to the first of the plurality of board output connectors when the one or more electrical devices detects that primary electrical energy from the first primary power supply has been interrupted along the first of the plurality of primary electrical pathways,
detect whether primary electrical energy from a second primary power supply has been interrupted along a second of the plurality of primary electrical pathways between a second of the plurality of primary power input connectors and a second of the plurality of board output connectors,
activate the second redundant power supply to supply the second redundant electrical energy to the second redundancy power input connector, and
direct the second redundant electrical energy along a first one of the plurality of second redundant electrical pathways that electrically connects to the second of the plurality of board output connectors when the one or more electrical devices detects that primary electrical energy from the second primary power supply has been interrupted along the second of the plurality of primary electrical pathways.

16. The system according to claim 15, wherein the one or more electrical devices comprises a plurality of integrated circuits mounted to the redundancy circuit board.

17. The system according to claim 16, wherein the plurality of integrated circuits are configured to perform at least one of:
monitoring each of the plurality of primary electrical pathways to determine if a flow of the primary electrical energy therethrough has been interrupted;
identifying through which of the plurality of primary pathways the primary electrical energy has been interrupted; or
breaking an electrical connection through one or more of the primary electrical pathways so that electrical energy cannot flow therethrough.

18. The system according to claim 16, wherein the plurality of integrated circuits comprises at least one of:
one or more first integrated circuits in electrical contact with each of the plurality of primary electrical pathway;
one or more second integrated circuits in electrical contact with each of the plurality of first redundant electrical pathways; and
one or more third integrated circuits in electrical contact with each of the plurality of second redundant electrical pathways.

19. The system according to claim 16, wherein the one or more electrical devices comprises a microcontroller mounted to the redundancy circuit board.

20. The system according to claim 19, further comprising a communication link for the transmission of information between the microcontroller and at least one of the plurality of integrated circuits, wherein the information comprises at least one of:
- an electrical property associated with the first of the plurality of primary electrical pathways sent from the at least one of the plurality of integrated circuits to the microcontroller, or a control signal from the microcontroller to the at least one of the plurality of integrated circuits.

* * * * *